April 8, 1969

T. R. KELLEY 3,437,826

CONTROL CIRCUIT FOR CONTROLLING DUTY OF
A PLURALITY OF D-C SOURCES

Filed Feb. 20, 1967

INVENTOR.
THOMAS RAY KELLEY
BY
OSTROLENK, FABER, GERB & SOFFEN
ATTORNEYS

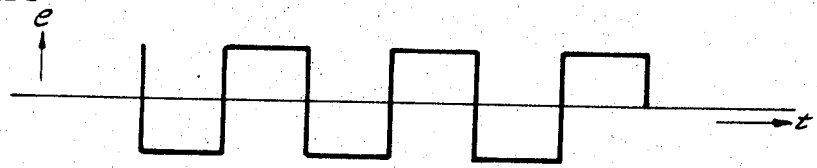
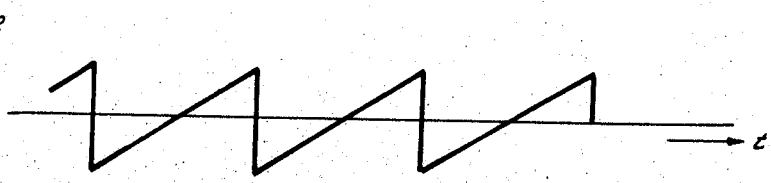
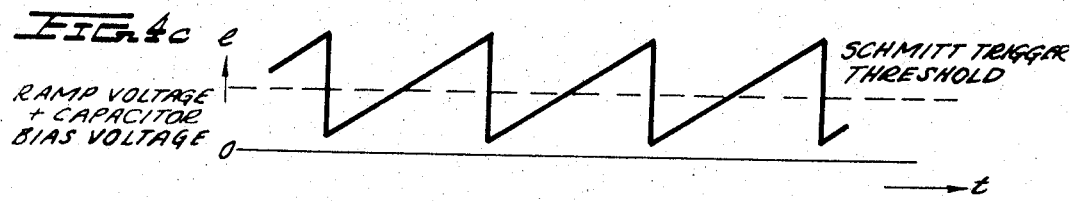
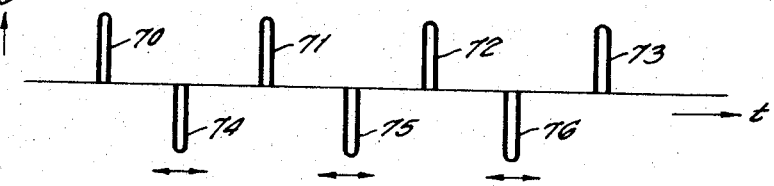
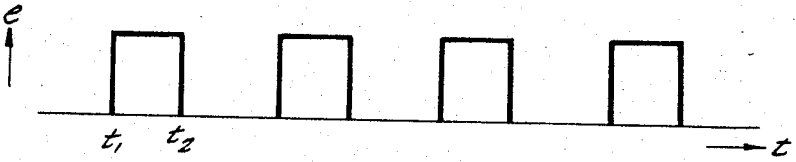

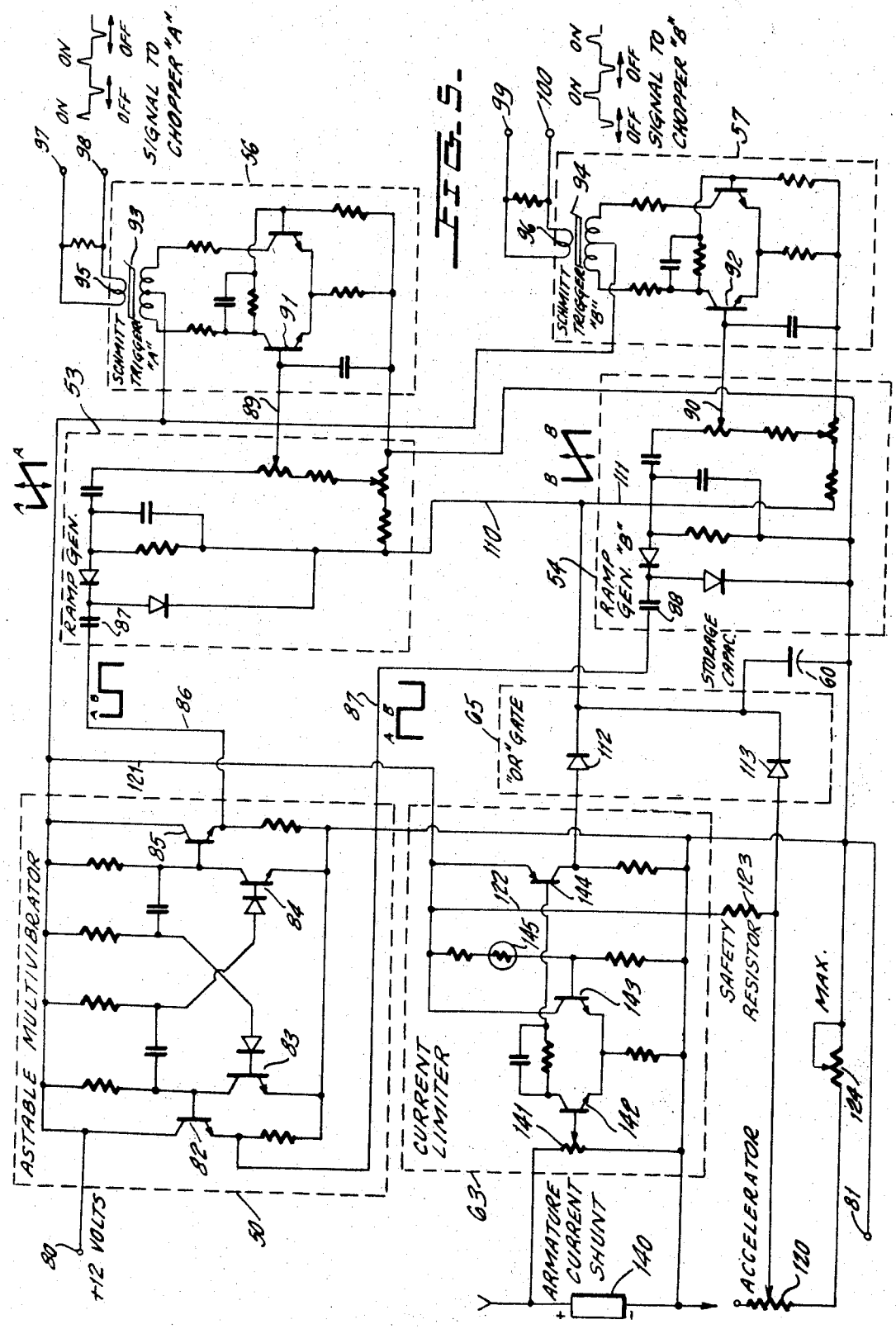

United States Patent Office 3,437,826
Patented Apr. 8, 1969

3,437,826
CONTROL CIRCUIT FOR CONTROLLING DUTY OF A PLURALITY OF D-C SOURCES
Thomas Ray Kelley, Audubon, N.J., assignor to I-T-E Circuit Breaker Company, Philadelphia, Pa., a corporation of Pennsylvania
Filed Feb. 20, 1967, Ser. No. 617,402
Int. Cl. H02j 1/10
U.S. Cl. 307—11       5 Claims

ABSTRACT OF THE DISCLOSURE

A control circuit delivers sequential pulses used to turn a chopper circuit on the same time within a cycle of an A-C source, but to turn it off at a selected time within the A-C phase so that the chopper can deliver voltage for only a predetermined length of time depending upon the adjustment of the off pulse. A square wave generator is connected to a ramp generator which generates a sawtooth rising voltage having a sharply defined trailing edge. A D-C component, which is determined in magnitude by the manual adjustment of an operator or by an automatic load current measuring system is superimposed on the ramp voltage to raise or lower the ramp voltage with respect to the threshold value of a Schmitt trigger. The Schmitt trigger will generate a pulse corresponding to the rapidly decaying edge of the sawtooth over a wide range of D-C bias values so that the Schmitt trigger will deliver an "on" pulse to the chopper at the same instant as for an A-C wave. A subsequent "off" pulse will be obtained when the ramp voltage reaches the Schmitt trigger threshold voltage, this point being adjustable in time depending upon the magnitude of the biasing voltage superimposed on the ramp voltage.

---

This invention relates to a regulation control circuit, and more specifically relates to a novel control circuit for battery-operated vehicles having motors energized through chopper regulator circuits which sequentially connect two or more batteries to the vehicle motor in the manner disclosed in copending applications, Ser. Nos. 432,684 and 451,402. The above-noted copending applications describe a novel application of choppers connected to respective batteries with the choppers connecting their respective batteries to a motor or other suitable load for an adjustable length of time. In particular, each of the choppers are sequentially closed at the same point with respect to a constant frequency and remain closed for any controlled length of time. The length of time that they remain closed will determine the amount of energy delivered to the load with regulation occurring without power loss that would be caused by regulating impedances or the like.

The present invention provides a novel control circuit which can be used to turn the various choppers on at some synchronous predetermined instant with respect to an A-C wave of fixed frequency and to turn the choppers off at some controlled point within the A-C wave. In particular the chopper circuits include devices subject to firing, such as controlled rectifiers which are controlled by the pulse output of a Schmitt trigger type circuit. The input voltage to the Schmitt trigger which controls the generation of pulses therefrom is a ramp voltage having a superimposed D-C bias which is obtained from some operator adjustment means or from the value of some output parameter of the device being controlled. These two signals are combined in an "OR" gate which in turn controls the charge level of a capacitor connected to the ramp voltage output. As this superimposed voltage raises the ramp level with respect to the Schmitt trigger threshold value, "OFF" pulses will be delivered at an earlier time so that the timing between the "ON" and "OFF" pulse is shortened to shorten the length of time that the chopper conducts. Similarly, depressing the capacitor voltage and thus the ramp voltage level, the ramp voltage will pass through the Schmitt trigger threshold voltage at a later time so that there is a greater spacing between the on and off output of the trigger to permit conduction of the chopper for a longer time.

Accordingly, a primary object of this invention is to provide a novel control circuit for chopper devices.

Yet another object of this invention is to provide a novel timing circuit for timing the conduction intervals of chopper type circuits by turning the circuits on at the same time with respect to a fixed A-C frequency turning it off at some controlled point.

These as well as further objects of this invention shall become readily apparent after reading the following description of the accompanying drawings in which:

FIGURES 4a through 4e illustrate diagrams of voltage as a function of time for the various elements of the circuit of FIGURE 3.

FIGURE 5 is a detailed circuit diagram of the block arrangement of FIGURE 3.

Figure 1:
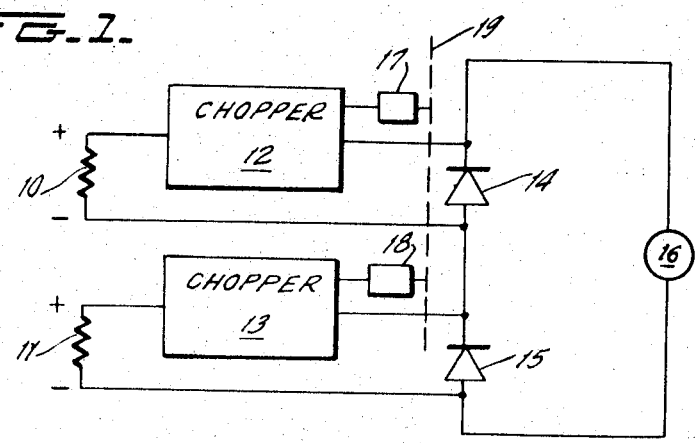
FIGURE 1 is a schematic diagram of a chopper type regulator circuit which is to be controlled by a circuit constructed in accordance with the present invention.

Referring first to FIGURE 1, there is schematically illustrated therein the type of chopper control circuit shown in the above noted copending application Ser. No. 451,-402. Generally, in FIGURE 1, two voltage sources 10 and 11, which could be batteries, are connected in series with choppers 12 and 13 respectively with each chopper and respective battery further connected in series with respective diodes 14 and 15. The diodes 14 and 15 are then connected in closed series relation with some suitable load 16 which could be the D-C motor of a vehicle. Each of the choppers 12 and 13 are then provided with respective control systems 17 and 18 which are synchronized with one another as illustrated by the dotted line 19 connecting the two. As described in the aforementioned Ser. No. 451,402, the choppers 12 and 13 are controlled so that they are synchronously turned on at different times with respect to one another and are turned off after some controlled length of conduction. This will then permit choppers 12 and 13 to individually apply their output voltages to the load 16 in step fashion when their conduction lengths are too short to overlap. When, however, the conduction lengths of the choppers 12 and 13 overlap, during the overlapping interval, their voltages are effectively connected in series, whereupon the control of the duration of the conduction of choppers 12 and 13 will provide the effect of automatic and stepless voltage control of the voltage to be applied to D-C load 16.

Figure 2:
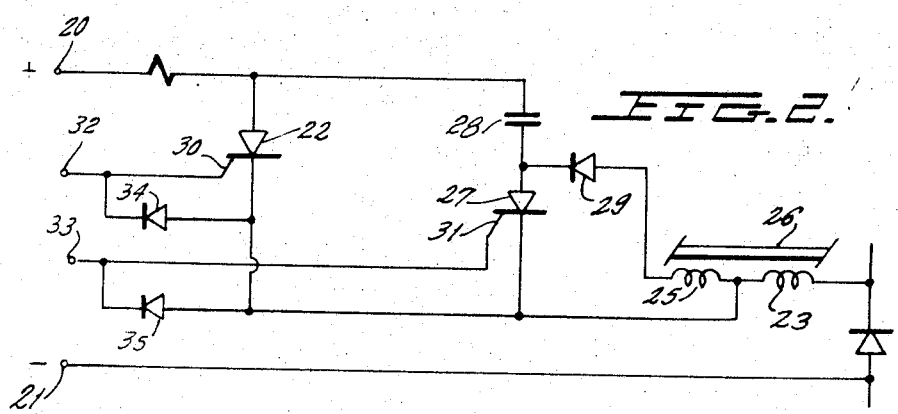
FIGURE 2 is a circuit diagram of a typical chopper circuit used in FIGURE 1.

FIGURE 2 illustrates a typical chopper circuit which could be used for choppers 12 and 13. Thus the chopper circuit would have input terminals 20 and 21 to which the voltage source, such as source 10 of FIGURE 1 would be connected. Terminal 20 is then connected to a controlled rectifier 22, the anode of which is connected to the primary winding of a step up transformer having a secondary winding 25 and a saturable type core, as illustrated by the symbol 26. An auxiliary controlled rectifier 27 and capacitor 28 are connected in parallel with controlled rectifier 22 with the bottom of capacitor 28 connected to winding 25 through diode 29. Gate terminals 30 and 31 of controlled rectifiers 22 and 27 respectively are then connected to terminals 32 and 33 respectively which are in turn connected to a suitable source of timing pulses, which is the subject of the present invention, and which controls the length of conduction of the chopper output. Suitable diodes 34 and 35 are connected across the gate circuits of controlled rectifiers 30 and 31 to protect these gates from excessive negative pulse energy.

Figure 3:
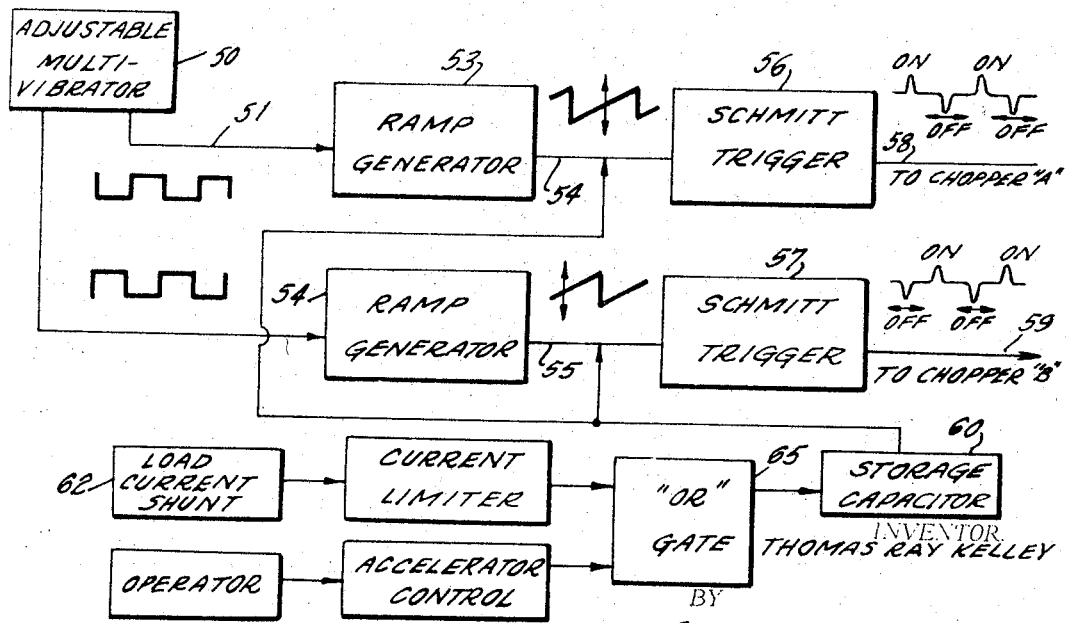
FIGURE 3 is a block diagram of the control circuit of the present invention.

FIGURE 3 is a block diagram of the novel control circuit constructed in accordance with the present invention for energizing terminals 32 and 33 of FIGURE 2 in order to control the conduction length of the chopper circuit.

The circuit of FIGURE 3 comprises an astable multivibrator 50 which generates a constant frequency square wave output at conductors 51 and 52 with the square wave of conductors 51 and 52 phase displaced from one another by 180°. These square waves are then applied to ramp generators 53 and 54 respectively which convert the square waves of conductors 51 and 52 to the ramp shaped waves illustrated above output conductors 54 and 55 respectively. The two ramp voltages of conductors 54 and 55 are then applied to respective Schmitt triggers 56 and 57 respectively which have output wave forms at conductors 58 and 59 comprised of equally spaced "ON" pulses with controllably positioned negative "OFF" pulses. The position of the "OFF" pulses within the wave shape of the Schmitt trigger outputs are controlled by a voltage bias determined by the charge on a storage capacitor 60. This charge is in turn determined by both an operator control 61 and a load current shunt 62 connected in series with the load being controlled. The load current shunt 62 is connected to a current limiter 63 while the operator control 61 can adjust an accelerator control 64 associated, for example, with a vehicle driven by a D-C motor. The two output signals from the current limiter 63 and accelerator 64 are combined in an "OR" gate 65 with the output of the "OR" gate 65 connected to storage capacitor 60 to control its charge condition.

FIGURES 4a through 4d illustrate the wave shapes of one channel leading from the astable multivibrator 50 to the Schmitt trigger 56 while the second channel terminating with Schmitt trigger 57 will operate in an identical but 180° phase displaced manner.

FIGURE 4c illustrates the square wave shape obtained from the constant frequency astable multivibrator 50 which is connected to the ramp generator 53. This output voltage is then converted to the sawtooth shape shown in FIGURE 4b where the sawtooth comprises a linearly rising voltage from a minimum to a maximum value over one full cycle of the constant frequency of the astable multivibrator 50. The storage capacitor 60 operates to superimpose a constant voltage on this ramp voltage so that, as illustrated in FIGURE 4c, the ramp voltage can be raised or lowered with respect to the Schmitt trigger threshold. That is to say, the Schmitt trigger 56 will operate to generate an output pulse when the input voltage connected thereto increases through the dotted line value, labeled Schmitt trigger threshold in FIGURE 4c, and will deliver another pulse when the voltage applied to the Schmitt trigger decreases below the Schmitt trigger threshold. For this reason, a series of constantly located pulses 70, 71, 72 and 73 will be delivered from the Schmitt trigger each time the rapidly decaying portion of the sawtooth of FIGURE 4c decreases through the Schmitt trigger threshold. These pulses can then be connected to terminal 32 of FIGURE 2 for constantly turning the chopper on at the frequency determined by the constant frequency of the astable multivibrator 50.

Note that if the capacitor voltage is so high that the sawtooth voltage is completely above the Schmitt trigger threshold, that the pulses 70 through 73 will not pass through the Schmitt trigger threshold so that the chopper will be completely off.

As the more gradual rising portion of the sawtooth voltage exceeds the Schmitt trigger threshold voltage, a second pulse will be generated, shown as pulses 74, 75 and 76 in FIGURE 4d, corresponding to the intersection of the ramp voltage and the Schmitt trigger threshold voltage. These pulses may be connected to terminal 33 of FIGURE 2 and serve to fire controlled rectifier 27 to turn the chopper off. The conduction period of the chopper will then be determined by the interval between the on pulses 70, 71 and 72 and their respective off pulses 74, 75 and 76. This timing can then be controlled by raising or lowering the ramp voltages in FIGURE 4c by increasing or decreasing the capacitor biasing voltage of capacitor 60. Therefore, the off pulse will be generated at some controlled time so that the duration of the chopper conduction will be controlled by the output voltage of capacitor 60 which can in turn be controlled by the operator 61 in FIGURE 3 or the nature of the output current through the load current shunt 62.

The duration of conduction of the chopper is illustrated in FIGURE 4e where chopper conduction for the first pulse starts at time $t_1$ corresponding to pulse 70 and ends at time $t_2$ corresponding to pulse 74. Succeeding pulses then begin at times corresponding to pulses 71, 72 and 73 and ending with pulses 75 and 76 and so on.

The complete circuit diagram of the functional block diagram of FIGURE 3 is shown in FIGURE 5 where the dotted boxes illustrate conventional circuits corresponding to the astable multivibrator 50, ramp generator 53, ramp generator 54, Schmitt trigger 56, Schmitt trigger 57, "OR" gate 65, and current limiter 63 in FIGURE 3. The entire control circuit may be energized by a voltage source connected between positive terminal 80 and negative terminal 81.

The astable multivibrator 50 is a standard circuit including the four transistors 82, 83, 84 and 85 with outputs taken from cathode followers from each side to apply two square wave signals on output conductors 86 and 87 which are 180° phase displaced from one another.

Each of ramp generators 53 and 54 comprise input capacitors 87 and 88 respectively connected to lines 86 and 87 respectively and include suitable circuit components for converting the square wave shape input into a ramp shaped output on output lines 89 and 90 respectively.

The output lines 89 and 90 of ramp generators 53 and 54 are then connected to the input transistors 91 and 92 respectively of the standard Schmitt triggers 56 and 57. The Schmitt triggers 56 and 57 employ standard circuitry, but are provided with center taped output transformers 93 and 94 respectively which have secondary windings 95 and 96 which terminate on terminals 97-98 and 99-100 respectively. Transformers 93 and 94 serve to isolate the circuit of FIGURE 5 from the chopper circuit of FIGURE 2 since the two may operate at different D-C levels.

The output terminals 97 and 98 of FIGURE 5 are then connected to terminals 32 and 33 of the chopper of FIGURE 2, while terminals 99 and 100 are connected to similar terminals of the second chopper. Thus in FIGURE 1, choppers 12 and 13 will be energized by "ON" pulses which are 180° phase displaced from one another and by "OFF" pulses which are similarly 180° phase displaced from one another, and cause respective chopper conduction for equal but controllable lengths of time.

In order to control the ramp level voltage and as pointed out in FIGURE 3, a capacitor 60, which is controllably charged to different voltage levels is connected to ramp generator conductors 110 and 111 for ramp generators 53 and 54 respectively. The capacitor 60 is then charged through the "OR" gate 65 composed of gate diodes 112 and 113 which provide low impedance paths for charging capacitor 60 quickly while preventing its discharge back into the discharging sources.

The first of the charging sources is comprised of the accelerator potentiometer 120. Potentiometer 120 carries current from the circuit which extends from positive terminal 80, conductor 121, conductor 122, safety resistor 123, maximum speed setting resistor 124 and negative terminal 81. The voltage drop across potentiometer 120 is then connected in the series circuit including gate diode 113, capacitor 60 and negative terminal 81. Clearly, by adjusting potentiometer 120, the charge of capacitor 60 will be adjusted whereupon the ramp voltage will be raised or lowered with respect to the threshold voltage of Schmitt triggers 56 and 57 thereby to adjust the position of the "OFF" pulses which turn off the conduction of the respective choppers. Note that the safety resistor 123 will cause full charging of capacitor 60 in the event of a failure of the accelerator 120 as due to an open circuit of the resistance element of potentiometer 120 or intermittent contact between the wiper arm and the resistance element of potentiometer 120. By charging capacitor 60 to its highest value, the ramp voltages of ramp generators 53 and 54 will be biased completely above the Schmitt trigger threshold so that the choppers will not conduct. In this regard, the circuit is "fail-safe" against failures of accelerator 120.

In addition to the operator control potentiometer 120, the output voltage of capacitor 60 is also controlled by the output current to the motor being controlled as measured by an armature shunt 140. The output of the armature current shunt is connected to a current limting circuit which operates to limit the maximum acceleration that can be obtained from the vehicle by limiting the maximum rate of discharge of storage capacitor 60. The current limiter arrangement 63 contains an input adjustment limiting potentiometer 141 which is connected to a transistor 142 which controls the operation of a normally conducting transistor 143. The circuit is so arranged that the normally conducting transistor 143 causes the emitters of transistors 142 and 143 to reach some predetermined value which normally prevents conduction of transistor 142 until a sufficiently positive signal voltage is applied to the base of transistor 142 from potentiometer 141 and thus from shunt 140. The voltage across the shunt 140 is proportional to the load current so that whenever the load current exceeds some predetermined level, transistor 142 conducts to subsequently cause conduction of transistor 144. The collector current from transistor 144 is then applied through gate diode 112 of "OR" gate 165, thereby increasing the voltage of capacitor 60 to decrease the duration between the firing pulses and thereby to decrease the current through shunt 140. A transistor-thermistor network which includes thermistor 145 is provided in the circuit to provide temperature compensation so that the current limiter will operate substantially independently of ambient temperature changes over a wide range.

While the current limiter 63 is illustrated to operate responsive to armature peak currents, it will be apparent that it could be suitably modified to respond to R.M.S. currents where the choppers employ control rectifiers in which maximum capability is determined by R.M.S. current rather than peak currents.

Although there has been described a preferred embodiment of this novel invention, many variations and modifications will now be apparent to those skilled in the art.

The embodiments of the invention in which an exclusive privilege or property is claimed are defined as follows:

1. A control circuit for synchronously generating a first series of pulses at a constant phase and a second series of pulses at an adjustable phase; said control circuit comprising means for generating a gradually rising, sharply decaying sawtooth wave shape of constant frequency, a Schmitt trigger, and means for generating adjustable D-C biasing voltage and means for adjusting said D-C biasing voltage; said sawtooth voltage generating means containing means for controlling the D-C level of said sawtooth wave shape; said means for generating an adjustable D-C biasing voltage connected to said means for controlling the D-C level of said sawtooth wave shape; said Schmitt trigger having an input circuit, an output circuit and a threshold voltage level; said Schmitt trigger generating an output pulse in said output circuit when the voltage of its said input circuit passes through said threshold voltage level; said sawtooth voltage generating means connected to said Schmitt trigger input circuit whereby said Schmitt trigger generates an output pulse each time the voltage of said sawtooth wave shape passes through said Schmitt trigger threshold level; first alternate output pulses due to said rapidly decaying portion of said sawtooth passing through said threshold having a constant phase location with respect to said constant frequency of said sawtooth; second alternate output pulses due to the gradually rising portion of said sawtooth having an adjustable phase with respect to said constant frequency of said sawtooth; said means for adjusting said D-C biasing voltage adjusting the phase of said second alternate output pulses.

2. The control circuit of claim 1 wherein said means for generating said sawtooth comprises a constant frequency astable multivibrator and a ramp generator connected to said astable multivibrator.

3. The control circuit of claim 1 wherein said means for adjusting said D-C biasing voltage includes adjustable potentiometer voltage source means, a diode and a capacitor; said adjustable potentiometer voltage source means, diode and capacitor connected in series; said capacitor connected to said D-C level control means of said sawtooth generator.

4. The control circuit of claim 3 which further includes second variable voltage means responsive to a predetermined condition, and a second diode; said second variable voltage means, said second diode and said capacitor connected in series; said diode and said second diode defining an "OR" gate.

5. The control circuit of claim 4 which further includes current limiting means connected to said second variable voltage means to limit the rate of change of output current therefrom to said capacitor below a predetermined value.

References Cited
UNITED STATES PATENTS

| | | | |
|---|---|---|---|
| 3,079,539 | 2/1963 | Guerth | 318—20.480 |
| 3,260,912 | 7/1966 | Gregory | 318—20.480 |

ROBERT K. SCHAEFER, *Primary Examiner.*

H. J. HOHAUSER, *Assistant Examiner.*

U.S. Cl. X.R.

318—20.480, 341